United States Patent [19]

Okada et al.

[11] Patent Number: 4,824,619
[45] Date of Patent: Apr. 25, 1989

[54] PROCESS OF PRODUCING POLYETHYLENE DRAWN FILAMENTS AND DRAWN FILMS

[75] Inventors: Fujio Okada; Toshihiko Ohta, both of Ohtsu, Japan

[73] Assignee: Toyo Boseki Kabushiki Kaisha, Japan

[21] Appl. No.: 135,235

[22] Filed: Dec. 21, 1987

[30] Foreign Application Priority Data

Dec. 19, 1986 [JP] Japan .................. 61-303448

[51] Int. Cl.$^4$ .................. B29C 47/92; B29C 55/00
[52] U.S. Cl. .................. 264/40.1; 264/164; 264/175; 264/210.1; 264/211.12; 264/288.4; 264/320
[58] Field of Search .................. 264/40.1, 164, 175, 264/210.1, 211.12, 280, 288.4, 320

[56] References Cited

U.S. PATENT DOCUMENTS

| | | | |
|---|---|---|---|
| 3,184,526 | 5/1965 | Klug | 264/175 |
| 4,272,474 | 6/1981 | Crocker | 264/322 X |
| 4,487,875 | 12/1984 | Nakajima et al. | 524/385 |
| 4,615,853 | 10/1986 | Aoyama et al. | 264/175 X |
| 4,643,865 | 2/1987 | Okada et al. | 264/288.4 |
| 4,734,196 | 3/1988 | Kono et al. | 210/500.36 |
| 4,769,433 | 9/1988 | Chanzy et al. | 264/288.4 X |

FOREIGN PATENT DOCUMENTS

| | | | |
|---|---|---|---|
| 55-135630 | 10/1980 | Japan | 264/175 |
| 58-89326 | 5/1983 | Japan | 264/288.4 |
| 60-189420 | 9/1985 | Japan | 264/210.1 |
| 61-293229 | 12/1986 | Japan | 264/210.1 |
| 8402961 | 4/1986 | Netherlands | 264/176.1 |
| 8500428 | 4/1986 | Netherlands | 264/176.1 |

*Primary Examiner*—Jeffery Thurlow
*Assistant Examiner*—Leo B. Tentoni
*Attorney, Agent, or Firm*—Wegner & Bretschneider

[57] ABSTRACT

A process for producing polyethylene drawn filaments and drawn films which comprises molding under pressure a mixture of 51 to 90 parts by weight of polyethylene powder having a weight average molecular weight of at least $4 \times 10^5$ and having no history of being molten or dissolved after polymerization, and 49 to 10 parts by weight of a solvent at a temperature lower than the melting point of the mixture, and then hot-stretching the molded product.

17 Claims, 1 Drawing Sheet

PROCESS OF PRODUCING POLYETHYLENE DRAWN FILAMENTS AND DRAWN FILMS

FIELD OF THE INVENTION

The present invention relates to a process for producing polyethylene drawn filaments and drawn films having both high strength and high modulus. More particularly, the present invention relates to an economical process for producing polyethylene drawn filaments and drawn films having both high strength and high modulus as well as a relatively large sectional area without using a large amount of solvent.

The term "high strength and high modulus" used herein means the strength of at least about 1 GPa and the modulus of at least about 50 GPa. The term "relatively large sectional area" used herein means the sectional area of at least about 0.01 mm² for drawn filaments, and the thickness of at least about 20 μ for drawn films.

BACKGROUND OF THE INVENTION

Hitherto, there have been known the following processes for producing drawn filaments and drawn tapes having both high strength and high modulus from ultra-high-molecular-weight polyethylene.

(a) Japanese Patent Kokoku No. 60-47922

A heated solution of polyolefin in a concentration of 1 to 30% by weight is spun.

(b) Japanese Patent Kokai No. 60-101032 (the present inventor's U.S. Pat. No. 4,643,865)

An aggregate of gel particles obtained by cooling a polyethylene solution is compression molded at a temperature lower than its dissolving temperature.

(c) Japanese Patent Kokai No. 58-217322

A single crystal aggregate mat obtained from a solution of polyethylene in a concentration of not more than 1% by weight is molded by extrusion at 70 to 135° C.

(d) Japanese Patent Kokoku No. 60-53690

A melt molded product from ultra-high-molecular-weight polyethylene is stretched at a temperature of higher than 150° C.

(e) P. Smith, H. Chanzy and B. Rotzinger, "Polymer Communications", 26, 258 (1985)

A polyethylene film polymerized at a relatively low temperature is directly stretched without dissolving it.

However, in the above conventional processes of (a) and (b), a large amount of solvent is used and, in the process (c), a particularly large amount of solvent is used. Among these processes, although it is possible to produce filaments and the like having relatively large sectional area by the process (b), the process (a) is directed to production of fine filaments having the sectional area of less than 0.01 mm² and, with increase in the sectional area of filaments, the resulting strength and modulus are decreased. The processes (d) and (e) are economical in that no solvent is used. However, both strength and modulus in the process (d) are much lower than those in the processes (a), (b) and (c). The process (e) is directed to stretching of small pieces which are polymerized in the form of thin films, and is not directed to a process for producing a long continuous drawn product having larger sectional area.

OBJECTS OF THE INVENTION

The main object of the present invention is to provide an economical process for producing polyethylene drawn filaments and drawn films having both high strength and high modulus as well as relatively large sectional area without using so large an amount of solvent.

This object as well as other objects and advantages of the present invention will become apparent to those skilled in the art from the following description with reference to the accompanying drawing.

BRIEF EXPLANATION OF DRAWING

In FIG. 1, each symbol represents as follows:

Figure 1:
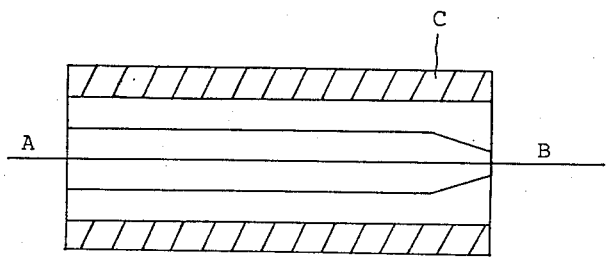
FIG. 1 is a schematic cross section of one example of a die used in the present invention.

A: inlet of die
B: outlet of die
C: heater

SUMMARY OF THE INVENTION

According to the present invention, there is provided a process for producing polyethylene drawn filaments and drawn films which comprises molding under pressure a mixture of 51 to 90 parts by weight of polyethylene powder having a weight average molecular weight of at least $4 \times 10^5$ and having no history of being molten or dissolved after polymerization, and 49 to 10 parts by weight of a solvent at a temperature lower than the melting point of the mixture, and then hot-stretching the molded product.

DETAILED DESCRIPTION OF THE INVENTION

The polyethylene powder used in the present invention has a weight average molecular weight of at least $4 \times 10^5$, preferably at least $1 \times 10^6$. When the weight average molecular weight of polyethylene used is less than $4 \times 10^5$, a drawn product having both high strength and high modulus can not be obtained. Further, the polyethylene powder used in the present invention should have no history of being molten or dissolved after polymerization. Examples of such polyethylene powder are Hifax 1900 (manufactured by Hercules Incorporated, U.S.A.) and Hizex Million 240 M (manufactured by Mitsui Petrochemical Industries, Ltd. Japan). They are produced by a low pressure polymerization process using a Ziegler catalyst. In the case of using polyethylene powder obtained by recooling after it has been once molten by heating, different from the present invention, a molded product therefrom cannot be stretched in such a degree that high strength and high modulus are obtained, even when a mixture of the powder and the solvent is molded under pressure at a temperature lower than its melting point. In the case of using polyethylene powder obtained by dissolving polyethylene in a solvent after polymerization and cooling the solution, it is uneconomic because this process requires a large amount of the solvent and many steps in comparison with the present invention. As described above, the polyethylene powder used in the present invention is that having a melting point of not lower than 130° C. and having no history of being molten or dissolved after polymerization and, preferably, it has such properties that a sheet obtained by compressing the powder with press plates at 130° C. under pressure of 40 kg/cm² can be stretched at a maximum draw ratio of at least 40 in an air bath at 130° C.

The above maximum draw ratio is determined as follows.

A sample of the above sheet of 0.1 to 0.2 mm in thickness is cut into tapes of 4 mm in width. The tape is stretched at the elongation rate of 50 mm/min. and at the gripping interval of 50 mm by using a tensile machine equipped with an air bath at 130° C. Once a tape has been stretched 8 times, the stretched tape is regripped at the gripping interval of 50 mm, and then stretched. This procedure is repeated until the sample is brought to its breaking point, and a total draw ratio is calculated.

The powder is used as it is, or it can be further pulverized. Preferably, the powder has an average particle size of not more than 400 μ. When the particle size of the powder is too large, a homogeneous molded product can not be obtained by molding under pressure.

The polyethylene powder used in the present invention may contain a small amount of one or more kinds of copolymerization ingredients or additives as far as the advantages of the present invention are not adversely affected.

The solvent for the polyethylene powder used in the present invention is that being able to swell polyethylene at a temperature lower than the melting point of a mixture of polyethylene and the solvent when they are mixed. Among solvents, it is preferred to use a solvent that is evaporated upon hot-stretching of a press molded product and scarcely remains in drawn filaments or drawn films. Examples of such solvents are decalin, tetralin, xylene, toluene, and aliphatic hydrocarbons such as nonane and decane and the like, and petroleum fractions having a boiling point of about 100° to 200° C. These solvents can be used alone or in combination thereof. Nonvolatile solvents also can be used, for example, liquid paraffin and paraffin wax. In the latter case, almost all the solvent used should be removed by extraction after press molding or in the step thereafter.

The formulation ratio of the polyethylene powder and the solvent is preferably in the range of 51 to 90 parts by weight of polyethylene powder and 49 to 10 parts by weight of the solvent. When the ratio of the solvent is more than 49 parts by weight, it is uneconomic because the amount of the solvent becomes too large and, in addition, it is difficult to obtain drawn products having larger sectional area as well as higher strength and modulus. Although the press molding can be carried out even when the formulation ratio of the solvent is lower than the above or no solvent is used, it is undesirable from the viewpoint of productivity because, in such a case, extremely high pressure is required.

As far as the advantages of the present invention are not adversely affected, the mixture used in the present invention can contain a small amount of third ingredients for the purpose of coloring, improving of flexibility and the like in addition to the polyethylene powder and the solvent. Examples of such third ingredients are powder or short fiber materials of low-density polyethylene, high-density polyethylene, and other synthetic resins, natural resins, and inorganic materials.

Then, the mixture is molded under pressure at a temperature lower than its melting point. The melting point of the mixture used in the present invention is determined as follows.

One mg of a sample is heated at a heating rate of 20° C./min. in a closed cell using THERMOFLEX DSC-10A (manufactured by Rigaku Denki Inc., Japan). An endothermic peak temperature is regarded as the melting point.

That is, the melting point of the mixture corresponds to the dissolution temperature of the polyethylene powder in the solvent.

Although the melting point of the mixture varies depending upon particular kinds of polyethylene and solvent used as well as a particular formulation ratio, it is lower than that of polyethylene alone. In general, the molding temperature is 3 to 20° C. lower than the melting point of the mixture, that is, between 100° and 124° C. When the molding temperature is too low, press molding requires very high pressure. Therefore, the molding temperature is preferably at least higher than a temperature at which polyethylene is well swollen with the solvent. Even when the molding temperature is higher than the melting point of the mixture, the molding can be carried out. However, in such a case, the molded product cannot be stretched at a high draw ratio and the desired objective drawn filaments or drawn films having high strength and high modulus cannot be obtained.

One example for molding the above mixture under pressure is extrusion from a die. In this case, there can be used an apparatus such as a screw extruder, a ram extruder or transport means such as a pump which can deliver the mixture under high pressure in combination with a die.

Preferably, a die hole should be long enough for feeding the mixture to a die to be heated at least up to the suitable temperature for extruding, It should not increase in sectional area in the extrusion direction and, particularly, the sectional area of the outlet opening should be 6 to 80% of that of the inlet opening. By using such a die, the mixture fed to the die is densified by pressure, and stretched and deformed toward the extrusion direction to form a continuous molded product which is suitable for stretching in the subsequent step. The extrusion pressure is selected so that extrusion can be carried out at a suitable rate according to a particular kind of the mixture, and particular shape and size of a die. The pressure is applied by the above extruder or pump. The pressure applied to a die part is usually 1 to 100 kg/cm². It is possible to draw the extruded product with applying a suitable tension upon taking it up from a die. The effect of this tension on the interior of a die is to decrease the extrusion pressure.

When the screw extruder is used, preferably, a temperature of the screw part is kept lower than a temperature at which the mixture is swollen strongly, and the mixture is heated to swell in a die part after passing through the screw part and then it is extruded from the outlet of a die. If the mixture is swollen strongly in the screw part, it becomes highly viscous to make extrusion difficult. In addition, irregular shearing action makes the mixture unsuitable for stretching in the subsequent step. Likewise, when other transport means are used, it is advantageous to keep the temperature of their working parts low.

Another example for molding the mixture under pressure is the roller press. The roller press applies pressure to a material fed to a gap between a pair of rollers to mold it into a sheet. Although it is necessary to carry out molding at a temperature lower than the melting point of the mixture, the mixture is preferably heated to its swelling point with the rollers or from their surroundings. A sheet delivered from the rollers can also be taken up with applying a tension to draw it Press rolling press can be repeated, if necessary. For this purpose, an apparatus having a combination of many rollers can be used.

Hot stretching effected after molding can be carried out according to a conventional technique, for example, by using a stretching machine equipped with a hot air bath. The stretching temperature is preferably lower than the melting point of the material to be stretched. In order to obtain a drawn product having both sufficiently high strength and high modulus, the draw ratio is at least 10.

Using to extrusion through a die in the present invention, there can be obtained drawn filaments having a cross section in the shape similar to that of the die cavity. That is, for example, draw filaments having a circular cross section, or flat, tape-like drawn filaments can be obtained. On the other hand, using a roller press, there can be obtained films or drawn tapes in various thickness.

The process of the present invention as described above can be distinguished from the above conventional processes particularly in the following point.

That is, in the present invention, the polyethylene powder having no history of being molten or dissolved after polymerization is used as the starting material, and molding is carried out at a temperature lower than its melting point. That is, the starting material is molded without being subjected to any melting or dissolution. To the contrary, in the above conventional processes (a), (b), (c) and (d), the starting material is always molded after being subjected to dissolution or melting treatment.

Further, in the process of the present invention, the polyethylene powder obtained by industrial polymerization is used as the starting material, and it is molded after swelling by the solvent without dissolution thereof, and then the molded product is stretched. To the contrary, in the conventional process (e), a polyethylene film obtained under special conditions is used as the starting material, and it is stretched as it is.

In the present invention, it is of importance that the molded product of the polyethylene which is never subjected to melting or dissolution treatment after polymerization should be stretched in view of the technical effect of the present invention. It is considered that the molded product maintains almost all the microstructures, for example, entanglement state of molecular chains in the starting polyethylene powder because molding is carried out as described above, and such microstructures are suitable for stretching. To the contrary, when a product is molded through melt treatment after polymerization, it is difficult to stretch the molded product because it is considered that the molded product has many entanglement points of molecular chains. The microstructures in the latter molded product are those newly formed after disappearance of the microstructures originally present in the polyethylene powder by melting.

If the maximum draw ratio of a sheet obtained by compressing a starting polyethylene powder as described above is less than 40, it is considered that such a starting polyethylene powder has been subjected to a melt treatment, or it has many entanglement points of molecular chains, originally.

Further, use of the solvent in the present invention is effective to swell the polyethylene powder and to form a homogeneous molded product suitable for stretching, although its use does not result in decrease in entanglement of molecular chains because the amount of the solvent used is relatively small and the temperature is lower than the dissolving point.

Furthermore, in the present invention, even when a drawn product having relatively large sectional area is produced, the drawn product having both high strength and high modulus with less porous texture can be readily obtained because the content of the solvent in the molded product for stretching in the present invention is smaller than that of a molded product of a conventional process wherein a dissolution state is involved.

In the present invention, the following advantages can be obtained, simultaneously.

(1) The amount of the solvent is less than that of the above conventional process (b) wherein molding is carried out through a dissolution state.

(2) The present invention provides an economical process because the polyethylene powder which is mass produced can be also used as the starting material, whereas the above conventional process (e) uses a much expensive starting material such as a polyethylene film polymerized under special conditions with low productivity and polyethylene polymerized powder under special conditions.

(3) The present invention can produce continuously drawn filaments and drawn films having relatively larger sectional area than that of the above conventional process (a).

(4) Strength and modulus of drawn filaments and the like of the present invention are much higher than those produced by melt molding, and they are comparable to those of the above conventional process (b) wherein molding is carried out through dissolution state.

(5) The polyethylene powder suitable for the starting material in the present invention can be readily selected.

The drawn filaments and the drawn films having both high strength and high modulus produced by the present invention are suitable for materials for tensile members of communication cables, ropes and the like. Although a material having a smaller sectional area produced by the conventional process requires steps for bundling and twisting them, or fixing them with epoxy resin or the like, the material according to the present invention can eliminate such steps and, in addition, lowering of strength and modulus due to twisting or impregnation of a resin can be avoided because of its relatively large sectional area.

The following Examples and Comparative Examples further illustrate the present invention in detail but are not to be construed to limit the scope thereof. All "parts" are by weight unless otherwise stated.

Example 1

A mixture of 55 parts of ultra-high-molecular-weight polyethylene, Hifax 1900 [manufactured by Hercules Inc., U.S.A.; Intrinsic Viscosity (hereinafter abbreviated as IV): 18.5 in decalin at 135° C.; average particle size: 260 u; weight average molecular weight: $2.1 \times 10^6$] and 45 parts of decalin was prepared. The melting point of the mixture was 127° C. The mixture was fed to a screw extruder, and was extruded through a heated die next to the screw extruder. The die had a straight pipe part, a conical nozzle part, and a heater C to keep a temperature of said two parts at constant as shown in FIG. 1. The sectional area of inlet A of the conical nozzle and that of outlet B are 78.5 mm² and 19.6 mm², respectively. The vertical angle of the conical part was 30°. The temperature of the screw part was kept at 50° C., and that of the die was kept at 120° C. upon extruding. The rate of feeding of the mixture was 18 g/min. and the internal pressure of the die was 5.2 kg/cm². The extruded product was taken up with applying tension so that the sectional area thereof was 15.2 mm². The extruded product thus taken up was stretched at a draw ratio of 16 through a heated air bath at 130° C. The resulting drawn filaments had the sectional area of 1.13 mm² as well as the tensile modulus of 85 GPa and the tensile strength of 1.6 GPa.

Polyethylene powder used in Example 1 and other Examples hereinafter were compressed into a sheet using a plate press according to the method described above, and stretched in a heated air bath to determine the maximum draw ratios. As the result, Hifax 1900 (IV: 18.5) had the maximum draw ratio of 12 and Hizex 240 M (IV: 15) had the maximum draw ratio of not more than 5.

Example 2

A mixture of 70 parts of ultra-high-molecular-weight polyethylene Hizex Million 240 M [manufactured by Mitsui Petrochemical Industries, Ltd., Japan); IV: 15 in decalin at 135° C., average particle size: 170 u; weight average molecular weight: $1.9 \times 10^6$)] and 30 parts of decalin was prepared. The melting point of the mixture was 131° C. This mixture was fed to the same apparatus as in Example 1 to form an extruded product. The temperature of the screw part was 50° C., that of the die part was 125° C., and the die pressure was 31 kg/cm². The extruded product was stretched at draw ratio of 15 through a heated air bath at 135° C. The resulting drawn filaments had the sectional area of 1.52 mm² as well as the tensile modulus of 62 GPa and the tensile strength of 1.4 GPa.

Example 3

A mixture of 60 parts of the same polyethylene powder as in Example 1 and 40 parts of xylene was prepared. The mixture having the melting point of 128° C. was fed quantitatively to the gap of a pair of rollers heated to 123° C., and past through the gap to form a sheet. The load applied to the rollers was 0.4 kg/cm². The resulting sheet was stretched at draw ratio of 19 at 130° C. By this stretching, there was obtained a continuous tape of 20 mm in width and 100 μ in thickness having the strength of 2.2 GPa and the modulus of 93 GPa in the stretched direction.

Comparative Example 1

According to the same procedure as described in Example 1, an extruded product was produced except that the temperature of the die was kept at 160° C. The internal pressure of the die was about 45 kg/cm².

The extruded product taken up was stretched through heated air bath at 130° C. Filaments stretched at the draw ratio of 9.2 had the sectional area of 2.7 mm2 as well as the tensile modulus of 19 GPa and the tensile strength of 0.6 GPa. The stretching at a draw ratio of above 10 could not be effected because of breaking. And, the extruding at the die temperature of 150° C. could not be effected because the internal pressure of the die became over 60 kg/cm².

Example 4

Step (A)

A suspension of dried silica gel in 0.0008 mol VCl$_4$ (vanadium chloride)-heptane solution was heated at the boiling point for 10 min. This suspension was cooled and decanted. The residue was thoroughly washed with heptane, and suspended in heptane again. To a 0.015 mol triisobutyl aluminum-heptane solution cooled to −38° C. in an argon atmosphere was added the above suspension, and ethylene was bubbled under pressure of 0.7 kg/cm² to react for 15 hours. Polymer resulting from the reaction was taken up by filtration, washed with methanol-hydrochloric acid and then with methanol, and dried to obtain polyethylene powder having IV of 27 (in decalin at 135° C.). A portion of the above polyethylene powder obtained by passing through a 40 mesh screen was used in the next step.

Step (B)

The polyethylene powder obtained in the Step (A) was pressed at 130° C. with plate under pressure of 400 kg/cm² for 10 min. to obtain sheet of about 0.18 mm in thickness. This sheet was stretched in an air bath heated at 130° C. according to the procedure as described above in detail. The sheet could be stretched at a draw ratio up to 200.

Step (C)

A mixture of 55 parts of polyethylene powder obtained in the Step (A) and 45 parts of decalin was prepared. The melting point of this mixture was 129° C. This mixture was fed to the same apparatus as in Example 1 to form an extruded product. The temperature of the screw part was 30° C., that of the die part was 123° C., and the die pressure was 7.3 kg/cm². The extruded product was taken up with applying tension so that the sectional area thereof was 16.5 mm². The extruded product thus taken up was stretched through an air bath heated at 130° C. at the draw ratio of 42. The resulting drawn filaments had the tensile modulus of 120 GPa and the tensile strength of 2.3 GPA.

Examples 5 to 7

Step (A)

According to the same procedure as described in the Step (B) of Example 4, sheets were formed from 3 kinds if polyethylene powders, Hostalen GUR 412 (manufactured by Hoechst Co., West Germany), Hifax 1900 (manufactured by Hercules Inc., U.S.A.; IV: 30 (in decalin at 135° C.)) and Hizex 145 M (manufactured by Mitsui Petrochemical Industries, Inc.; IV 8.2 (in decalin at 135° C.)). Maximum draw ratios of these sheets are shown in Table 1.

Step (B)

For each of the above 3 polyethylene powders used in the Step (A), a mixture of power and decalin was prepared and fed to the same extruder as in Example 1. Then, an extruded product was taken up. The extruded product thus taken up was stretched at the draw ratio of 80% wherein the extruded product was broken. Conditions for extrusion and stretching, and characteristics of drawn filaments are shown in Table 2.

As seen from Table 2, when pressed into a sheet, polyethylene powder having a maximum draw ratio of at least 40 gives filaments having both higher tensile modulus and higher tensile strength in comparision with those having a maximum draw ratio of less than 40 (for example, Hizex 145 M and GUR 412).

TABLE 1

| polymer | Example 5 Hifax 1900 IV = 30 | Example 6 Hizex 145 M IV = 8.2 | Example 7 GUR 412 |
|---|---|---|---|
| Average particle size (μ) | 150 | 200 | — |
| Max. draw ratio | 44 | ≦5 | ≦5 |

TABLE 2

| | | Example 5 Hifax 1900 IV = 30 | Example 6 Hizex 145 M IV = 8.2 | Example 7 GUR 412 |
|---|---|---|---|---|
| Mixture | polyethylene (parts) | 60 | 60 | 60 |
| | decalin (parts) | 40 | 40 | 40 |
| | melting point of mixture (°C.) | 129 | 127 | 128 |
| Extrusion temperature of die part (°C.) | | 123 | 120 | 122 |
| Extruded product; sectional area (mm²) | | 16.7 | 15.8 | 16.0 |
| Stretching | temperature of stretching bath (°C.) | 130 | 130 | 130 |
| | draw ratio | 2.8 | 10 | 13 |
| Extruded product | tensile modulus (GPa) | 100 | 51 | 53 |
| | tensile strength (GPa) | 2.0 | 1.3 | 1.3 |

Comparative Example 2

Hifax 1900 (IV: 18.5) was used as polyethylene powder and was fed to the same screw extruder as in Example 1 without adding any solvent such as decalin or the like. Then, the extrusion through the heated die next to the extruder was tried. However, it was impossible because the material had no fluidity when the temperature of the screw part was 50° C. Further, when both temperatures of the screw part and the die part were raised from 50° C. to 143° C. (the melting point of Hifax 1900 (IV: 18.5)) and the extrusion was tried. However, it was also impossible because the material was extremely viscous in the above entire temperature range.

What is claimed is:

1. A process for producing polyethylene drawn filaments and drawn films which comprises molding under pressure a mixture of 51-90 parts by weight of polyethylene powder having a weight average molecular weight of at least $4 \times 10^5$ and having no history of being molten or dissolved after polymerization, and 49 to 10 parts by weight of a solvent at a temperature lower than the endothermic peak temperature of the mixture, and then hot-stretching the molded product.

2. A process according to claim 1 wherein the polyethylene powder having no history of being melted or dissolved after polymerization has a melting point of not lower than 130° C. and has a maximum draw ratio of at least 40 which is determined by the following measuring procedure:

polyethylene powder is compression molded by a plate press at 130° C. under pressure of 400kg/cm² to form a sheet which is stretched in an air bath at 130° C. to measure its maximum draw ratio.

3. A process according to claim 1, wherein the molding is carried out by heating the mixture fed to the die to swell it and extruding from the die.

4. A process according to claim 3, wherein a die hole does not increase in sectional area in the extrusion direction, and the outlet sectional area is in the range of from 6 to 80% of the inlet one.

5. A process according to claim 1 wherein the molding is carried out by a roller press.

6. A process according to claim 2 wherein the draw ratio is at least 10.

7. A process according to claim 2, wherein the molding is carried out by heating the mixture fed to the die to swell it and extruding from the die.

8. A process according to claim 2, wherein the molding is carried out by a roller press.

9. A process according to claim 2, wherein the draw ratio is at least 10.

10. A process according to claim 1, wherein the molding temperature is 3°-20° C. lower than the endothermic peak temperature of the mixture.

11. A process according to claim 2, wherein the molding temperature is 3°-20° C. lower than the endothermic peak temperature of the mixture.

12. A process according to claim 1, wherein the molding temperature is between 100°-124° C.

13. A process according to claim 2, wherein the molding temperature is between 100°-124° C.

14. A process according to claim 1, wherein the molded product has a tensile strength of at least about 1.3 GPa.

15. A process according to claim 2, wherein the molded product has a tensile strength of at least about 1.3 GPa.

16. A process according to claim 1, wherein the tensile modulus is at least 51 GPa.

17. A process according to claim 2, wherein the tensile modulus is at least 51 GPa.

* * * * *